Dec. 22, 1970                    D. J. FOOTE                    3,548,486
            ART OF INTERLOCKING PLATE ASSEMBLY FOR
                    LAMINATED PADLOCK BODIES
               Original Filed Nov. 7, 1967
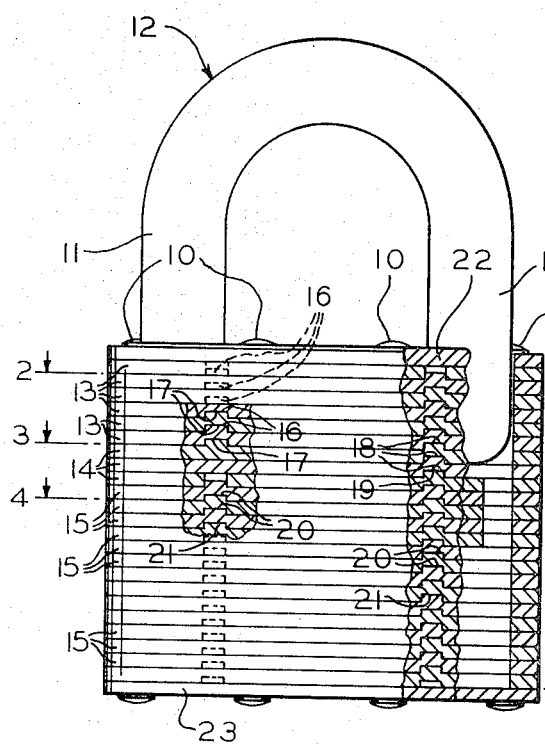
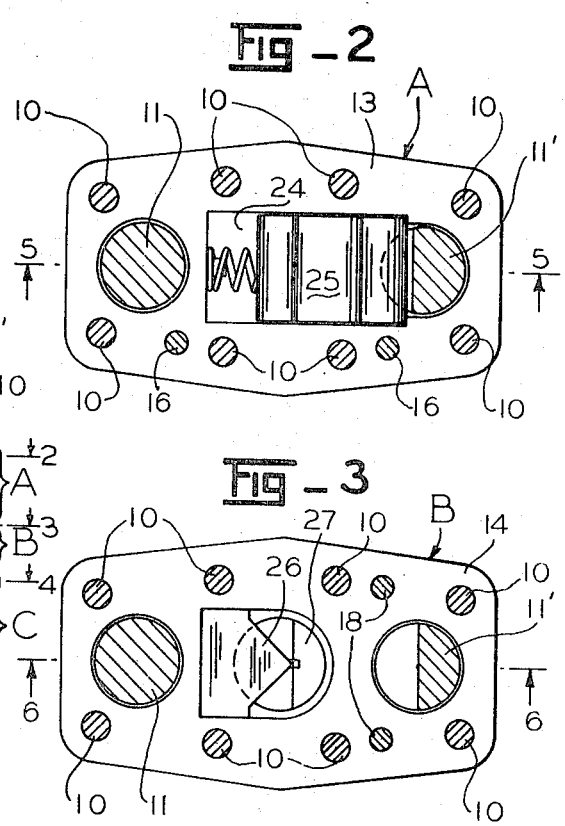
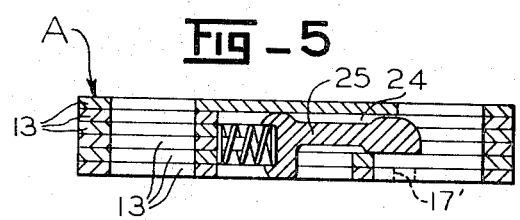
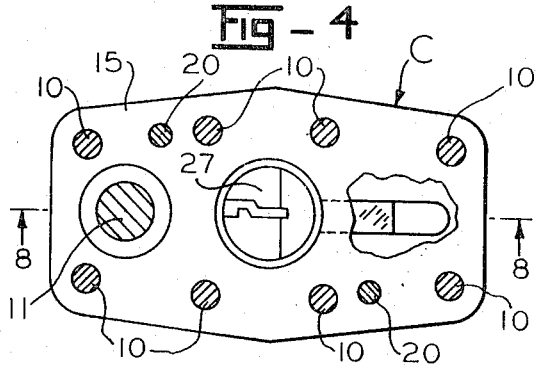
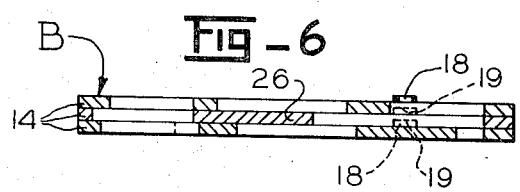
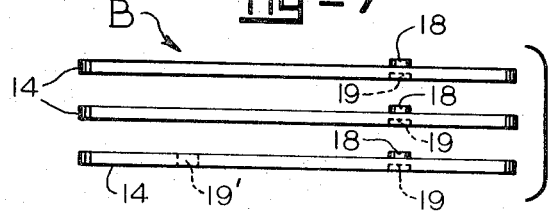
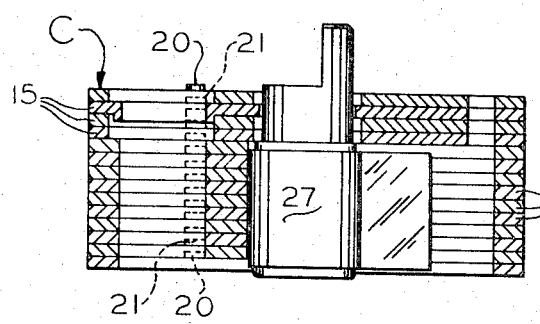
INVENTOR
DANIEL J. FOOTE
BY
ATTORNEY United States Patent Office 3,548,486
Patented Dec. 22, 1970

3,548,486
ART OF INTERLOCKING PLATE ASSEMBLY FOR LAMINATED PADLOCK BODIES
Daniel J. Foote, Wauwatosa, Wis., assignor to Master Lock Company, Milwaukee, Wis., a corporation of Wisconsin
Original application Nov. 7, 1967, Ser. No. 681,232, now Patent No. 3,422,644, dated Jan. 21, 1969. Divided and this application Sept. 27, 1968, Ser. No. 763,114
Int. Cl. B23p 21/00
U.S. Cl. 29—469        3 Claims

ABSTRACT OF THE DISCLOSURE

To provide for the advance assembly of plates used to form the laminated body of a padlock into groups of various multiples, the pluralities of plates of each group are formed with similarly spaced protuberances to tightly fit into correspondingly spaced recesses in each superimposed plate of said group, whereby the plural number of plates of a group will be held together. Other groups of plates for the complete padlock laminated body, with different spacing arrangements of the plate protuberances and recesses, are similarly assembled. Thereafter, the pre-assembled groups of plates to constitute a padlock body are arranged and registered one on another, and are secured together in perfect alignment by rivets or the like.

BACKGROUND OF THE INVENTION

Field of the invention

The present invention pertains to the art of manufacturing laminated padlock bodies wherein a padlock body comprises several superimposed groups of plates, with the plates of one group differing somewhat from the plates of adjacent groups in their provision of body recesses to accommodate internal working components of the padlock, and is a division of application Ser. No. 681,232, filed Nov. 7, 1967, now Pat. No. 3,422,644.

Description of the prior art

Applicant is not aware of anything in the prior art which in any way approaches the buildup of the laminated padlock body of the present invention and the method of pre-assembling various groups of plates with cooperating interlocking means.

SUMMARY OF THE INVENTION

In the past, the assembly of the superimposed plates which constitute the laminated body of a padlock have presented difficulties. The number of laminations or plates to be used in the padlock body depends upon the size, height and style of the padlock being manufactured. It has been customary to use some means such as a jig to hold the superimposed plates in proper position to permit the insertion through the registering rivet holes in the plates of securing rivets but, should one or more of the plates shift, proper alignment will be destroyed and difficulty will be encountered in respect to the registration of the rivet holes. The prior procedure mentioned required hand labor and considerable time, which substantially increased the assembly costs of said laminated padlock bodies. It should also be mentioned that the plates being assembled to form the padlock body are constructed to conform with certain portions of the padlock, some of the plates being apertured to accommodate the working parts of the padlock. This necessitated assembling the padlock body plates in predetermined positions and if an error was made in the assembly the defective lock body would have to be discarded.

Pursuant to the present invention, the prior difficulties inherent in the manufacture of laminated padlock bodies are overcome. This is accomplished by the advance assembly of groups of plates of various multiples whereby all of the plates of a given group are secured together in superimposed relation and thereafter the several groups, required for the complete padlock body, are then assembled one on another and secured in this condition. The present invention results in the stack of plates of each group matching perfectly internally so that rivet, shackle, and spring or cylinder openings therein match or are in perfect alignment, and the peripheral portions of the laminations or plates are smooth and in perfect alignment one with another. The stacking or grouping of the plates can be accomplished automatically by machine, and the entire procedure for assembling a laminated padlock body is relatively simple, expeditious, and very efficient and effective.

A still further object of the invention is to provide, in the manufacture of a laminated padlock body, superimposed plates wherein the plates of one group are formed with spaced proturberances to fit into similarly spaced recesses in the next adjacent plate of said group, but the location of the protuberances and recesses in the various plates may vary with respect to different groups so that the plates of one group will not get mixed up with the plates of another group and can be applied only for the intended group sub-assemblies.

Still another object of the present invention is to provide, in the manufacture of laminated padlock bodies, means permitting the advance manufacture of numerous sub-assembly groups for ultimate simple and easy assembly to form laminated padlock bodies at a considerable time and labor saving.

Still further objects of the present invention are to provide an improved method of assembling interlocking plates into laminated padlock bodies which is simple, expeditious, and well adapted for the purposes described.

BRIEF DESCRIPTION OF THE DRAWING

In the drawing, wherein the same reference numerals designate the same or similar parts in all of the views:

FIG. 1 is a side view of a padlock having a laminated body wherein the plates forming various sections, A, B and C of the body, are formed with interlocking protuberance and recess means and are pre-assembled, parts of the body being broken away and in section to show structural details;

FIG. 2 is a horizontal sectional view taken approximately along the line 2—2 of FIG. 1 and showing an interlocking plate of the type included in Group A in the completed laminated body;

FIG. 3 is a horizontal sectional view taken approximately along the line 3—3 of FIG. 1 and showing an interlocking plate of the type included in Group B in the padlock body;

FIG. 4 is a horizontal sectional view taken approximately along the line 4—4 of FIG. 1 showing an interlocking plate of the type included in Group C of the assembled body;

FIG. 5 is a vertical sectional view of the pre-assembled plates of Group A of FIG. 1, taken approximately along the line 5—5 of FIG. 2, with the padlock shackle legs and rivets omitted;

FIG. 6 is a vertical sectional view of the pre-assembled plates of Group B of FIG. 1, taken approximately along the line 6—6 of FIG. 3, with the shackle legs and rivets omitted;

FIG. 7 is a side view of a group of separated plates of the type used in Group B prior to the pre-assembly thereof shown in FIG. 6; and FIG. 8 is a vertical sectional view of the pre-assembled plates of Group C of FIG. 1, said view being taken approximately along the line 8—8 of FIG. 4, only with the shackle leg and rivets omitted.

DESCRIPTION OF THE PREFERRED EMBODIMENT

An advantageous type of padlock has its body portion formed of a plurality of superimposed laminations or plates which, in the assembled padlock, are held together by a plurality of rivets 10. All of the laminations are of similar contour, but in order to provide for certain padlock body cavities to receive the legs 11 and 11' of the padlock shackle 12 and other components of the padlock, certain groups of plates used in the composite laminated body are provided with registering openings therein, differing in arrangement in the plates of one group relative to those of another group.

The difficulties encountered in the prior practice of assembling plates for a laminated padlock body have heretofore been recited. Pursuant to the present invention, however, said difficulties are eliminated by an assembly method and laminated plate arrangement which provides for advance assembly of groups of plates of various multiples, with the plates being provided with interacting protuberances and recesses so that the plates of each group can be pre-assembled and held together, and in the completely assembled body there will be interlocking as between a plate of one group and the adjacent plate of another group.

For purposes of illustration, the plates utilized in Group A are designated by the numeral 13; the plates utilized in Group B are designated by the numeral 14; and the plates forming Group C are designated by the numeral 15. As will be seen from FIGS. 2, 3 and 4 of the drawing, it is advantageous, although not essential, that the interlocking protuberances and accommodating recesses be varied as to disposition relative to the plates of the several groups. For instance, and merely by way of illustration, the protuberances 16 of the plates 13 of Group A may be longitudinally spaced apart inwardly of one logitudinal margin of their respective plates 13. Said protuberances 16 projecting upwardly from the top face of each plate 13 are adapted to tightly lodge into recesses 17 therefor in the bottom face of a plate 13 immediately thereabove, with said recesses being positioned in longitudinally spaced relationship conforming to the spacing of the protuberances 16.

As to the plates 14 used in Group B, by way of example, it may be convenient to have the protuberances 18 thereon transversely spaced apart, toward one end of each plate, to lodge in similarly positioned recesses 19 in the adjacent plates 14 of Group B.

As to the plates 15 constituting those included in Group C, the protuberances 20 (see FIG. 4) may be diagonally arranged to be received by diagonally disposed recesses 21 in the bottom face of each adjacent plate.

The advantage of having the varied protuberance and recess arrangement of the plates of the various Groups A, B and C will be brought out more fully hereinafter. However, when there is a variation in the arrangement of the protuberances and recesses in the plates of one group relative to those of the next group, it is essential that the bottom plate of each group have recesses therein positioned and arranged to receive the projecting protuberances of the top plate of the group immediately therebelow. This is illustrated in FIG. 6, wherein the bottom plate 14 of group B has a recess 19' longitudinally spaced from one of its recesses 19, adapting the lowermost plate of Group B, for instance, to the reception of the protuberances 20 as arranged in the plates 15 of Group C immediately therebelow. Similarly, the lowermost plate 13 of Group A has recesses 17' positioned to receive the protuberances 18 of the top plate 14 immediately therebelow of Group B. Above the uppermost plate 13 of Group A is a standard top plate 22, and below the lowermost plate 15 of Group C is a standard bottom plate 23 to complete the assemblage.

It will be apparent from the drawing that the openings in the plates of one group may differ in location and shape from those of the plates of the companion groups in order to accommodate certain of the lock components. For instance, as shown in FIGS. 2 and 5, the plates 13 of Group A have registering recesses 24 therein to adapt said plates to the proper housing therein of a locking lever 25 subassembly. The plates 14 of Group B are recessed to house a locking spring sub-assembly 26, and the plates 15 of Group C are apertured so that when in their superimposed condition they provide a suitable cavity for the cylinder sub-assembly 27 of the lock. It should also be observed that the plates are formed with spaced-apart circular openings which, when the plates are superimposed, provide suitable openings for the legs 11 and 11' of the padlock shackle 12.

As was before mentioned, there is an advantage in having the protuberances and recesses of the plates of one group varied in disposition relative to the plates of the other groups. Thus, when a worker is pre-assembling groups of plates, those to be used in the C groups can be easily distinguished and picked out by virtue of the protuberance arrangement which, in this instance, is diagonal. Likewise, the plates of the B group are readily distinguishable because, as herein illustrated by way of example, the protuberances 18 may be transversely spaced apart on one side of the transverse center of the plates. Finally, it is simple for the assembler to pick out the proper plates for the A group because, in this particular embodiment, their protuberances are longitudinally spaced apart.

From the description thus far given it will be apparent that the laminated body of the improved padlock of the form shown in FIG. 1, by way of example, is built up by the superimposition of three groups, A, B and C, of pre-assembled plates or laminations. The plates 13 of Group A are easily identified by a worker by virtue of the arrangement of the protuberances 16 thereon, and the required number of said plates for said group are stacked and are caused to interlock by the insertion of the protuberances 16 of each plate into the recesses 17 of a plate 13 immediately thereabove. Any suitable means can be utilized for stacking the plates of a given group and pressing them together so as to cause the interlocking of the plate protuberances and recesses. As a result, each stack or group of plates matches perfectly internally so that the rivet, shackle leg and lock component openings therein match or are perfectly aligned and the peripheries of the plates are effectively lined up and provide for a smooth exterior surface. The pre-assembled plates for Group A may have mounted in their registering openings or cavity 24 the locking lever assemblage 25.

In the same manner the worker can select, by virtue of the location of the protuberances 18 and recesses 19, the plates to be utilized in the pre-assembly of Group B, and this is accomplished in the same manner as described above. Also, the registering openings therein which provide a cavity may have inserted therein the locking spring sub-assembly 26.

Pre-assembly of the plates 15 for Group C is accomplished in the same manner, said plates being readily identified by the worker by virtue of the different arrangement of the protuberances 20 and recesses 21 therefor, and the aligned openings in said plates 15 provide a cavity for the lodgement of the cylinder sub-assembly 27. It is, of course, obvious that a plural number of Groups A, B and C may be thus pre-assembled and then for the completion of the laminated body of each individual lock a set of pre-assembled Groups A, B and C are arranged in superimposed relation, as shown in FIG. 1, and each group is held to the next group by the protuberances of its uppermost plate lodging in recesses properly located therefor in the lowermost plate of the group immediately thereabove. When a body is assembled from a set of A, B and C groups, it may be completed by the addition of a standard top plate 22 and a bottom plate 23, and the holes for the rivets 10 are in perfect alignment, as are the openings for the shackle legs. When the rivets are inserted and secured, the padlock body is in completed form and all of the plates or laminations therein are in perfect alignment, the assembly having been effected expeditiously and accurately. Due to the fact that there is the interlocking relationship between the plates in the body, the lock body is not dependent alone on the rivets 10 to hold the multiple number of plates in position, and the interlocking of the individual plates adds to the overall strength of the lock body.

From the foregoing description it will be clear that pursuant to the present invention the plates of the various groups to constitute the laminated body of a padlock are pre-formed with proper openings therein and with specifically arranged protuberances and recesses for the mutual interlocking of the plates of the respective groups and of each group relative to the other. Matching plates for each group are arranged in superimposed position as sub-assemblies with lock components inserted therein, followed by the assembly of all of the groups for a given padlock to form the laminated body thereof. The improved method of forming interlocking plate assemblies for laminated padlock bodies is simple, expeditious, practical, and results in a superior type of laminated padlock body.

What is claimed as the invention is:

1. The method of manufacturing a laminated padlock body wherein said body includes a plurality of groups of matching superimposed plates with the plates of each group being formed with registering openings for the reception of lock components, comprising: forming the plates of each group with matching and complementary securing means wherein the arrangement of said means for one group differs from the arrangement of said means for the other groups; arranging matching plates with like securing means in superimposed, secured-together relationship as plural group sub-assemblies; including in the registering openings of each sub-assembly a specific padlock mechanism component; arranging in superimposed relation a plurality of different group sub-assemblies; and finally securing together the superimposed sub-assembly groups to form a laminated, mechanism-equipped padlock body.

2. The method recited in claim 1 wherein the matching and complementary securing means with which the plates of each group are formed include similarly spaced protuberances on each plate of a group and correspondingly spaced recesses in each adjacent plate.

3. The method recited in claim 1 wherein the groups of superimposed sub-assemblies are secured together as a unit by means of rivets extended through all of the plates of all of the groups.

References Cited

UNITED STATES PATENTS

| | | | |
|---|---|---|---|
| 2,330,765 | 9/1943 | Voight | 70—38 |
| 2,379,437 | 7/1945 | Hines et al. | 70—38 |
| 2,471,291 | 5/1949 | Soref et al. | 70—39 |
| 2,587,522 | 2/1952 | Pilkington, Jr. | 267—52 |
| 2,975,312 | 3/1961 | Ploran | 29—525X |

JOHN F. CAMPBELL, Primary Examiner

V. A. O. PALMA, Assistant Examiner

U.S. Cl. X.R.

29—407